UNITED STATES PATENT OFFICE.

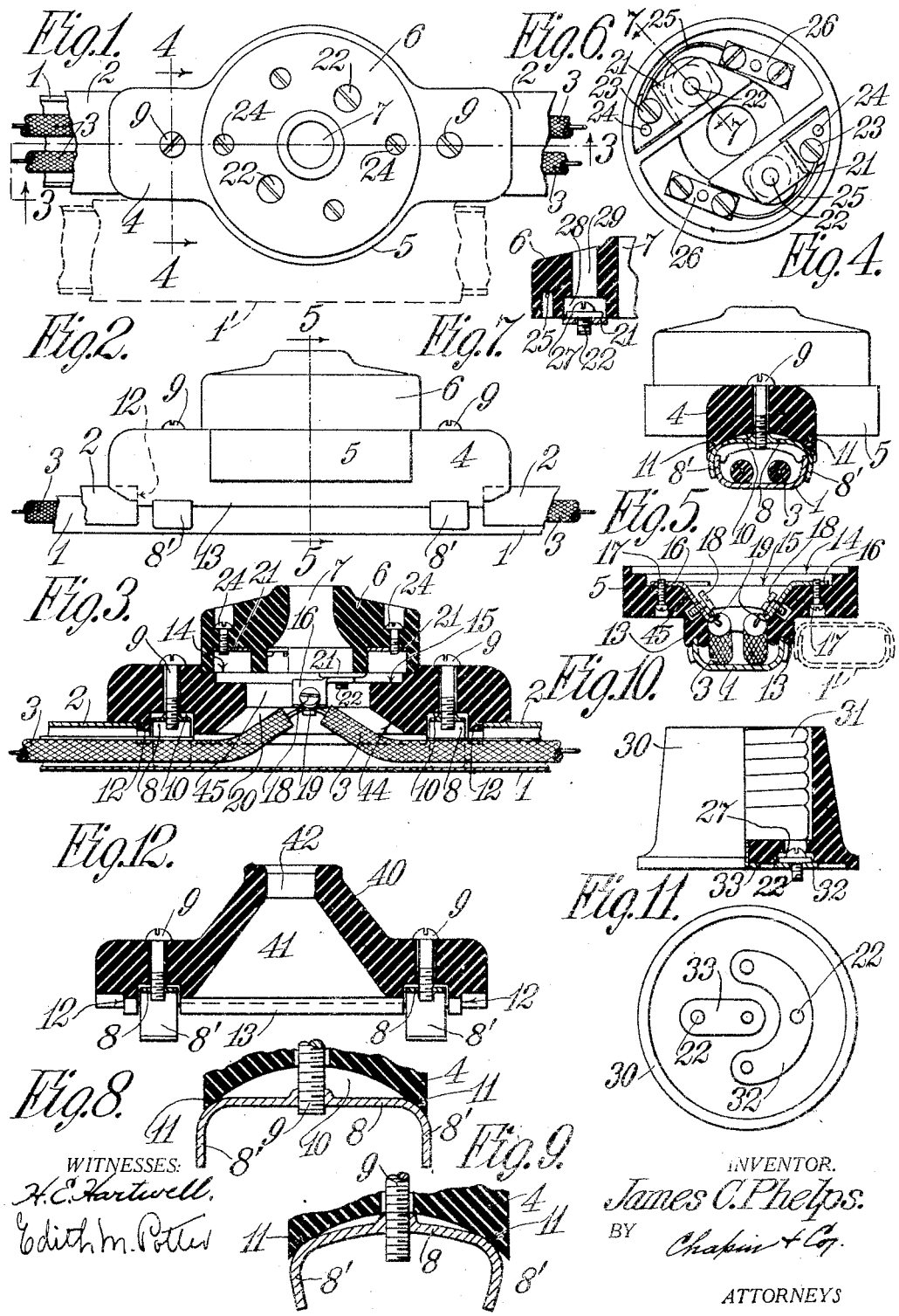

JAMES C. PHELPS, OF SPRINGFIELD, MASSACHUSETTS.

FITTING FOR ELECTRIC CONDUITS.

1,165,205.     Specification of Letters Patent.     Patented Dec. 21, 1915.

Application filed July 8, 1914. Serial No. 849,711.

*To all whom it may concern:*

Be it known that I, JAMES C. PHELPS, a citizen of the United States of America, residing in the city of Springfield, county of Hampden, and State of Massachusetts, have invented certain new and useful Improvements in Fittings for Electric Conduits, of which the following is a specification.

This invention relates to fittings for electrical conduits.

More specifically it relates to improved means for securing such fittings to electrical conduits and particularly to that form of conduit known in the art as "metal molding."

An object of the invention is to provide simple yet efficient means to secure electrical fittings to metal conduits.

Another object is to provide a device of the class described, which is quickly and conveniently attachable to or detachable from the conduit.

Another object is to provide a device as above described which is applicable to existing conduit installations without extensive alterations therein, as well as to new installations.

A further object is to provide a securing device, which is adapted to secure to electrical conduits, rosettes, lamp receptacles, switches and all analogous fittings.

Other objects dealing with the improved construction of parts will appear in the detailed description to follow.

In general my device comprises a base member, suitably formed to receive upper members of all types such as rosettes, receptacles and switches. The base member is formed on its under side to receive the conduit and is attached thereto by clips of novel form. These clips are mounted within a recess in the base member and are provided with depending portions to engage the conduit. These portions are adapted to be forced inwardly against the exterior side walls of the conduit by a screw, the actuating head of which protrudes through the upper portion of the base member so that it is conveniently accessible. Within the base member and closely adjacent the top of the conduit are terminal screws to which the wires within the conduit are attached. By the location of these screws closely adjacent the conduit, very little "slack" in the wires in the conduit is necessary to connect the wires to the terminal screws. This arrangement is highly desirable when it is necessary to apply fittings to existing conduit installations as, obviously, little slack in the wires in the conduit can be there obtained and splicing would otherwise be necessary. The base portion is also so arranged that all portions protruding outwardly therefrom, lie above the top of the conduit. Consequently, a second line of conduit can be laid closely adjacent the first line and in the same plane. Furthermore, the device can by this arrangement be applied to one line of conduit without interfering with a parallel and closely adjacent line which is of great importance when fittings are to be placed on existing metal molding installations.

An essential feature of my invention lies in the particular method of securing the fitting to the conduit whereby the sides only of the conduit are engaged by the clip. Therefore, in existing installations it is not necessary to remove the conduit or metal molding from the wall in order to readily apply elaborate securing devices. My device requires only that a small portion of the cap member of the conduit be cut away to receive the fitting which operation is always necessary in the application of all types of fittings. No other change or operation is necessary to attach the fitting which is a distinct advantage in construction work. Also in new installations the conduit may be laid and the wire pulled therein before the application of the fitting to the conduit is made which is also a decided advantage in installing. Other advantages of my device will appear in the detailed description to follow.

A preferred embodiment of my invention is illustrated in the accompanying drawings in which:

Figure 1 is a plan view showing my device with a "fused rosette" thereon, attached to "metal molding." Fig. 2 is a side elevational view thereof. Fig. 3 is a longitudinal sectional view taken on the line 3—3 of Fig. 1. Fig. 4 is a cross sectional view taken on the line 4—4 of Fig. 1 and looking in the direction of the arrows. Fig. 5 is a cross sectional view taken on the line 5—5 of Fig. 2 and looking in the direction of the arrows. The upper portion or "rosette"

member is not shown in this figure. Fig. 6 is a bottom plan view of the "rosette" portion of my device, showing the fuse wire located therein. Fig. 7 is a fragmentary sectional view taken on the line 7—7 of Fig. 6 and looking in the direction of the arrows. This view is illustrative of the novel and improved means for attaching the "rosette" portion to the base portion. Figs. 8 and 9 are detail views on an enlarged scale of the securing clip. These views are somewhat exaggerated to better illustrate the clamping action of the clip. Fig. 10 is an elevational view partly in section of a lamp "receptacle" which is adapted to be attached to base member in place of the "rosette." Fig. 11 is a bottom plan view of the device shown in Fig. 10 and shows the means for securing the "receptacle" to the base member. Fig. 12 is a longitudinal sectional view taken similarly to Fig. 3, illustrative of a modification.

Referring to the drawings, 1 represents the base member and 2 the cap member of a common form of "metal molding", the wires therein being indicated at 3.

4 represents the base portion of my fitting and 5 an integral circular portion thereon which is adapted to receive the "rosette" member 6. Formed in the under side of the base 4 and on either side of the central portion 5 are concave recesses 10 (see Figs. 3, 4, 8) which are adapted to receive clips 8. The latter are substantially semi-elliptical in shape and are formed with integral depending portions 8'. The central portion of each clip 8 is tapped to receive a screw 9 which passes vertically upward through the base 4, as clearly shown in Fig. 4. The depending portions 8' are arranged to lie closely adjacent to the sides of the molding 1 and to grip the same when the screw 9 is tightened.

The action of the clip 8 will be clearly understood with reference to Figs. 8 and 9 which show the clip in exaggerated form. Fig. 8 shows the initial position where the clip 8 is open to receive the molding 1. The outer and upper portions of the clip 8 bear against the concaved recess 10 of the member 4 at the points 11. As the screw 9 is turned the central portion of the clip is drawn upwardly into the recess 10 and the depending portions 8' are thereby caused to move inwardly to grip the side walls of the metal molding, as shown in Fig. 9. Thus the more the screw 9 is turned, the tighter the portions 8' grip the molding. It will thus be seen that these clips 8 form a positive and strong attaching means which are quickly, easily, and conveniently operable.

The base 4 is designed to rest on and be supported by the base portion 1 of the molding and is formed with grooved depending portions 13 to engage the same (see Fig. 5).

It is to be noted that as the clips 8 are actuated to grip the sides of the molding 1, the inward movement of the portions 8' is such as to provide a slight downward component which serves to pull the base 4 against the molding 1. Each end of the base 4 is recessed to receive the cap member 2 which abuts a shoulder 12 (see Fig. 3). These recesses conceal the cut ends of the "capping" 2 and the completed installation is thereby given a finished and neat appearance without particular care being used in cutting the "capping" 2 squarely.

The circular portion 5 of the base 4 is recessed to form a circular flange 14 upon which rests the "rosette" or analogous member 6. Within and below the circular flange 14 is a second circular flange 15 adapted to receive the terminal contacts to be later described. Within the flanged portion 15 is an opening 20 which communicates with the molding 1. The walls of the opening 20 are inclined as shown at 45 and upon these walls and upon the flange 15 are mounted a pair of contact members 16 which are secured to the portion 5 by screws 17, as clearly shown in Fig. 5. On the inclined portions of members 16 are terminal screws 18 adapted to clamp the wires 3 to the members 16. The lower ends of the contacts 16 are upturned as indicated at 19, forming in coöperation with the screws 18, positive means for securing the wires 3. It is to be noted particularly that by reason of the location of the screws 18 on an inclined wall 45 closely adjacent the top of the molding 1, the wires may be conveniently attached. Moreover, little slack in the wires is necessary for this action due to the low location of the screws 18 in the diverging walls 44 of the opening 20, the screws 18 in fact being near the lower border of the opening to permit attaching the wires in the conduits thereto when there is very little slack therein.

The outwardly extending circular portion 5 of the member 4 is so arranged that the lower surface thereof lies above the top of the capping 2. This construction allows a second line of molding 1' to be laid closely adjacent the line of molding 1, as indicated in Figs. 1 and 5. This feature is particularly desirable when fittings are to be applied to existing work as heretofore described.

Figs. 6 and 7 show a "fused rosette" attachable to the base 4. The "rosette" 6 is formed with a central aperture 7 for the reception of a flexible pair of conductors. The latter are adapted to be connected to a pair of metallic strips 26 secured to the rosette 6 in the usual manner. A second pair of strips 21 are secured to the rosette 6 by screws 24. A fuse wire 25 connects the strips 26 and 21, which is clamped by a screw 23, all in the ordinary way. Screws 22 are provided in the strip 21 to secure the latter to the contacts 16 on the base 4 heretofore described, which construction forms a positive contact between the strip and contact piece 16. Fig. 7 shows the novel arrangement of these screws 22. The latter are loose in the strips 21 and are provided with an integral washer 27—that is to say a washer that is made a part of the screw itself. The latter is disposed within a hole 28 in the member 6. A hole 29 of smaller diameter than the hole 28, connects the latter with the top portion of the rosette 6 and allows access to the head of the screw 22. It is to be noted particularly that this particular construction confines the screw 22 within the rosette 6 so that it can not fall therefrom and be lost when the rosette is held in an inverted position. These screws 22 connect the strips 21 and 16 serving a double purpose of making the electrical connection between and securing the rosette 6 to the base 4.

Figs. 10 and 11 illustrate a lamp receptacle 30 which is adapted to be attached to the base 4 in place of the rosette 6. The receptacle 30 comprises the usual socket member 31 which is electrically connected to the strip 32 in the usual manner. A central contact (not shown) within the socket member 31 is electrically connected to a strip 33 in the ordinary way. Each strip 32 and 33 is provided with attaching screws 22 identical in every detail with those shown in connection with the rosette 6. Similarly, I may provide other members attachable to the base 4, comprising fuseless rosettes, switches and other analogous devices.

A modification of my device is shown in Fig. 12. The member 40 is a one piece member attachable to the molding 1 in a manner identical with that described. The point of difference lies in the fact that it is a one piece member without a separable upper member, as heretofore described. An opening 42 connects with a downwardly diverging opening 41 which leads to the molding. The opening 42 is adapted to receive a pair of flexible conductors which are adapted to be directly connected to the wires in the molding.

It is recognized that many modifications may be made in the structure herein disclosed without departing from the scope of my invention as more truly defined in the appended claims.

What I claim is:

1. A fitting for electrical conduits, comprising in combination with said conduit, a recessed member adapted to rest thereon, means to attach said member to said conduit comprising a clip formed with free end portions adapted to grip said conduit and located in the recess of said member and means located at a distance from the free end portions to force said portions against the recessed walls of said conduit for detachably securing the member thereto.

2. A fitting for electrical conduits, comprising in combination with a conduit, a member formed with a curved portion and adapted to rest thereon and means to attach said member to said conduit, said means comprising flexible clips within the curved portion of said member and formed with portions to engage and grip said conduit, and means connecting said member and said clip to force said portions against said conduit for detachably securing the member thereto.

3. A fitting for electrical conduits comprising in combination with a conduit, a member adapted to be attached thereto and means to attach said member to said conduit, said means comprising clips located in recesses formed therein to receive said clips, said clips being formed with depending portions to engage the walls of said conduits and means to force said portions against said walls to secure said member thereto.

4. A fitting for electrical conduits, comprising in combination with a conduit and a capping member therefor, a device adapted to rest on said conduit, said device being formed in each end with a shouldered recess to receive said capping member, means to attach said device to said conduit, comprising clips located in recesses formed therein to receive said clips, said clips being formed with depending portions to engage the walls of said conduits and means to force said portions against said walls to detachably secure said member thereto.

5. A fitting for electrical conduits comprising in combination with a trough-shaped conduit having a bottom and side walls and a cap therefor, a member of insulating material formed with depending grooved legs that are adapted to rest on the upper edge of said side walls, said member being formed adjacent each end thereof with a shouldered recess to receive said cap, means to attach said member to said conduit, and comprising clips attached to said member, said member being formed with recesses therein to receive said clips, said clips being formed with depending portions to engage the walls of said conduits, and means to force said portions against said walls to secure said member thereto.

6. In a fitting for electrical conduits, the combination with the conduit, of a member adapted to coöperate therewith, means to attach said member to said conduit, said means comprising a clip substantially semi-elliptical in shape and formed with free bent-in end gripping end portions adapted to engage the side walls only of said conduit, and threaded means located substantially midway between the ends of said portions, the outer end portions of said clips engaging said member to force said portions inwardly and against said side walls, said means being operable from the outside of said member.

7. A fitting for electrical conduits, comprising in combination with a conduit and wires therein, a base member formed with concave recesses therein, clips in said recesses formed with portions adapted to engage said conduit, said base member being formed with a central opening therethrough having inclined walls, terminal strips on the latter, binding screws therein, said screws adapted to secure said wires to said terminal strips, a cap member, and means to secure said cap member to said base member.

8. A fitting for electrical conduits comprising in combination with a conduit and wires therein, a base member, clips to secure the same to said conduit, said base member being formed with a circular flanged recess and an opening extending from said recess through said base, said opening having inclined walls, terminal strips on said inclined walls, binding screws in said strips adapted to clamp said wires to said strips, an upper member adapted to rest in said flanged recess, conducting strips on said upper member and means to connect the same to said strips on said base member.

9. A fitting for electrical conduits comprising in combination with a conduit and wires therein, a base member, clips to secure the same to said conduit, said base member being formed with a circular flanged recess and an opening extending from said recess through said base, said opening having inclined walls, terminal strips on said inclined walls, binding screws on said strips adapted to clamp said wires to said strips, an upper member adapted to rest in said flanged recess, conducting strips on said upper member, screws therein formed with washers integral therewith, said screws adapted to connect said strips in said upper member to said strips in said base member and means to confine said screws within said upper member.

10. A fitting for electrical conduits, comprising in combination with a trough shaped conduit adapted to receive conducting wires, of a capping member therefor, a base member of insulating material formed at each end with a concave recess and a shoulder, said capping member adapted to lie in said recess and abut said shoulder, depending grooved portions on said base portion, said grooved portions adapted to receive the side portions of said conduit and to rest thereon, said base member formed with other concave recesses, spring clips in said last named recesses formed with portions to engage said conduits, screws in said base member and in said clip adapted to force said portions on said clips against said conduit, said base member formed with a central opening passing therethrough and communicating with said conduit, a cap member on said base member, conducting strips on said base and cap members, means to connect said strips in said cap to said strips in said base member, binding screws on said strips in said base and inclined thereto, said screws being located adjacent said conduit and adapted to clamp said wires therein to said conducting strips in said base member.

11. A fitting for electric conduits comprising in combination with said conduit, a member adapted to rest thereon and having the lower surface spaced away from the bottom of the conduit substantially equal to the thickness of the conduit, whereby a second conduit may be placed below the member and close to the side of the conduit on which the member rests, means to attach said member to the conduit, comprising a clip formed with portions to engage said conduit, and means to force said portions against the walls of said conduit.

12. A fitting for electrical conduits of the two part type, comprising in combination with the base member of said conduit, a base member formed with concave recesses therein, clips in said recesses formed with portions adapted to engage the sides of said base member and means to draw the clips against the concave recess to move the ends of the clips into clamping engagement with said base member, as described.

13. An attachment for an electrical conduit comprising, a member having an opening therethrough formed with inclined walls, terminals on said walls and arranged near the lower border of the opening to attach the wires in the conduit thereto, wire securing means in the terminals, said terminals having upturned ends, and means to detachably secure the attachment to said conduit.

14. In a fitting for electrical construction, a base-member, formed with an opening therethrough, the border of which is formed with a ledge portion, terminal strips secured to the wall of the opening and extending to the ledge portion and having a threaded opening in the end of the terminal strips, a cap-member having a terminal strip on its base portion, a screw rotatably supported in said strip and designed to enter the threaded opening in the terminal strip of the base member to draw the two terminal strips together to form a positive contact therebetween.

15. A fitting for electrical conduits, comprising in combination, with a conduit and wires therein, a base-member formed with an opening therethrough, means for securing said member to the conduit, terminal strips having hooked ends and secured to the wall of the opening near the border of the opening adjacent to the conduit, binding screws in the terminals to secure the wires in the conduit thereto as described, whereby said wires will only have to be elevated a short distance above the conduit to attach said wires to the hooked ends of the terminal strips.

JAMES C. PHELPS.

Witnesses:
H. E. HARTWELL,
HARRY W. BOWEN.